US007095523B2

(12) United States Patent
Brossman et al.

(10) Patent No.: US 7,095,523 B2
(45) Date of Patent: Aug. 22, 2006

(54) VIRTUAL PRINTER WITH ASYNCHRONOUS JOB AND DEVICE STATUS

(75) Inventors: Craig Duray Brossman, Boulder, CO (US); Arianné Therese Hinds, Boulder, CO (US); Nenad Rijavec, Longmont, CO (US); Mark Andrew Stephens, Westminster, CO (US); Raymond Glenn Wardell, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 10/318,717

(22) Filed: Dec. 12, 2002

(65) Prior Publication Data

US 2003/0123084 A1    Jul. 3, 2003

(51) Int. Cl.
G06F 3/12 (2006.01)
G06K 15/00 (2006.01)
(52) U.S. Cl. ..................... 358/1.15; 358/1.14
(58) Field of Classification Search ........ 358/1.1–1.18; 709/102, 103, 223–232; 710/7–47
See application file for complete search history.

(56) References Cited

U.S. PATENT DOCUMENTS 5,050,100 A    9/1991    Damon et al. .............. 364/514

(Continued)

OTHER PUBLICATIONS

J.R. Carlock and M.G. Lotz,"Kernel API Approach to Driving IPDS Printers", IBM Technical Disclosure Bulletin, vol. 35. No. 6, Nov. 1992.

(Continued)

Primary Examiner—Douglas Q. Tran
(74) Attorney, Agent, or Firm—Blakely, Sokoloff, Taylor & Zafman LLP

(57) ABSTRACT

A flexible and extensible virtual printer architecture is provided. According to one aspect of the present invention final status associated with a presentation job (e.g., a fax job or a print job) is made available to an output server. One or more host processing threads or processes are spawned for each new presentation job received by the output server. Then, the presentation job is submitted to a presentation device for which the presentation job is destined by way of an instance of a wrapper process that is capable of communicating bi-directionally with the presentation device. After submitting the presentation job, a host job status thread or process waits for status pertaining to the presentation job. Ultimately, a final status associated with the presentation job is received by the wrapper process and the wrapper process reports the final status to the host job status thread or process. According to another aspect of the present invention, job and device status may be reported asynchronously. One or more host processing threads or processes are spawned for each new presentation job received. A first presentation job is submitted to a presentation device for which the presentation job is destined by way of a first instance of a wrapper process that communicates bi-directionally with the presentation device. Subsequently, a second presentation job is submitted to the presentation device by way of a second instance of the wrapper process. A first and second job status thread or process wait for status pertaining to the first and second presentation jobs, respectively. A final status associated with the second presentation job is received by the second instance of the wrapper before a final status associated with the first presentation job is received by the first instance of the wrapper. Then, the second instance of the wrapper process reports the final status to the second job status thread or process.

31 Claims, 8 Drawing Sheets

U.S. PATENT DOCUMENTS

| | | | |
|---|---|---|---|
| 5,157,765 A | 10/1992 | Birk et al. | 395/163 |
| 5,402,527 A | 3/1995 | Bigby et al. | 359/101 |
| 5,537,550 A | 7/1996 | Russell et al. | 395/200.11 |
| 5,550,957 A | 8/1996 | Davidson, Jr. et al. | 395/114 |
| 5,566,278 A | 10/1996 | Patel et al. | 395/114 |
| 5,583,933 A | 12/1996 | Mark | 379/355 |
| 5,611,046 A | 3/1997 | Russell et al. | 395/200.1 |
| 5,615,314 A | 3/1997 | Schoenzeit et al. | 395/114 |
| 5,727,220 A | 3/1998 | Hohensee et al. | 395/774 |
| 5,828,863 A | 10/1998 | Barrett et al. | 395/500 |
| 5,859,956 A | 1/1999 | Sugiyama et al. | 395/112 |
| 6,208,428 B1 | 3/2001 | Chihara et al. | 358/1.15 |
| 6,301,011 B1 | 10/2001 | Fung et al. | 358/1.15 |

OTHER PUBLICATIONS

T.C. Aden, B.C. Goodson, J.B. K, McMonale, J.M. Prusaitis and B.E. Trede, "Use Of Page Records to Synchronize Printing While Converting", IBM Technical Disclosure Bulleting, vol. 35, No. 6, Nov. 1992.

VIRTUAL PRINTER WITH ASYNCHRONOUS JOB AND DEVICE STATUS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to driving heterogeneous devices from an output server. More particularly, the invention relates to a flexible mechanism which allows jobs containing formatted data, such as image data, to be submitted to arbitrary devices.

2. Description of the Related Art

Print servers, such as the IBM® InfoPrint® Manager, traditionally provide for central management of a printing environment. A simplified printing scenario in a local area network (LAN) environment will briefly be described with reference to FIG. 1. In this example, a personal computer workstation 100 is coupled to a print server 120 via a LAN 110. The print server 120 includes a spooler 130 for controlling the spooling of data files and presentation services 140 for generating appropriate commands to drive an attached printer. The print server 120 may also include other components that are not shown for performing basic tasks, such as monitoring and configuring attached printers, and providing print job management. At any rate, when the PC workstation 100 has data to print, it sends print data to the print server 120. Among the functions typically provided by a print server is the conversion of the data stream containing the print data to a data stream supported by the printer to which the print data is destined. In this example, the print server 120 is coupled to a first printer 150 and a second printer 160. The two printers 150 and 160 may each respond to different data streams. For instance, the first printer 150 may accept the Intelligent Printer Data Stream (IPDS) and the second printer 160 may accept PostScript. Therefore, the print server 120 must provide a means for converting between the various input data streams that may be received and the two data streams accepted by the printers 150 and 160. While in this simplified example only two types of printers have been shown, it should be appreciated that real world printing environments may include many different types of printers.

Increasingly, this is the case in professional printing environments, such as commercial and production printing environments which are becoming more and more diverse. While print servers typically support diverse printing environments, such support is costly in terms of the development effort required to modify the print server software in existing inflexible architectures. For example, in order to accommodate a new data stream, it is common to add a new complex printer driver to the print server. In existing print server architectures, these print drivers must typically be developed from scratch to incorporate the rich set of features that users have come to expect. This rewriting of code is required because typically the print server's capabilities and transforms are coded for a particular type of data stream and for a particular path through the print server. Also impacting the development efforts, is the inherent difficulty in manipulating the complex data streams that are received by print servers and transforming them into equally complex data streams required by printers. In view of the foregoing, it is desirable to provide a flexible and extensible architecture that allows support for new output devices to be added easily and inexpensively.

Another problem associated with existing print servers is the limited range of output devices supported. It is often desirable to present or deliver information in a form other than printer hard copy. Therefore, it would be advantageous to provide a mechanism to support output to destinations including fax and email, for example.

Prior art output servers also have other significant limitations which perplex end users. Fax servers report the fact that they have successfully transmitted a fax job. However, there is no indication of the success or failure of the job being received and/or handled at the destination. Often, unwary end users are surprised to discover that their "successful" job was not successful at the receiving end. Similar limitations exist in printer control protocols that only report the success or failure of a print job being converted to image. Therefore, it is desirable to provide a mechanism by which additional job and device status may be provided to the end user.

BRIEF SUMMARY OF THE INVENTION

A flexible and extensible virtual printer architecture is described. According to one aspect of the present invention final status associated with a presentation job is made available to an output server. One or more host processing threads or processes are spawned for each new presentation job received by the output server. Then, the presentation job is submitted to a presentation device for which the presentation job is destined by way of an instance of a wrapper process that is capable of communicating bi-directionally with the presentation device. After submitting the presentation job, a host job status thread or process waits for status pertaining to the presentation job. Ultimately, a final status associated with the presentation job is received by the wrapper process and the wrapper process reports the final status to the host job status thread or process. Advantageously, in this manner, a mechanism is supplied by which additional job and device status may be provided to the end user.

According to another aspect of the present invention, a method of recovering from presentation job errors is provided. A data stream generator establishes a bi-directional communication link between itself and an intermediate process. The data stream generator transmits a data stream comprising a presentation job to the intermediate process by way of the bi-directional communication link. Status information is received by the data stream generator, including an indication of a device error if the presentation device was unable to complete the presentation job. Subsequently, the presentation job may be restarted at the point of failure by the data stream generator.

According to yet another aspect of the present invention, job and device status may be reported asynchronously. One or more host processing threads or processes are spawned for each new presentation job received. A first presentation job is submitted to a presentation device for which the presentation job is destined by way of a first instance of a wrapper process that communicates bi-directionally with the presentation device. Subsequently, a second presentation job is submitted to the presentation device by way of a second instance of the wrapper process. A first and second job status thread or process wait for status pertaining to the first and second presentation jobs, respectively. A final status associated with the second presentation job is received by the second instance of the wrapper before a final status associated with the first presentation job is received by the first instance of the wrapper. Then, the second instance of the wrapper process reports the final status to the second job status thread or process.

Other features of the present invention will be apparent from the accompanying drawings and from the detailed description which follows.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
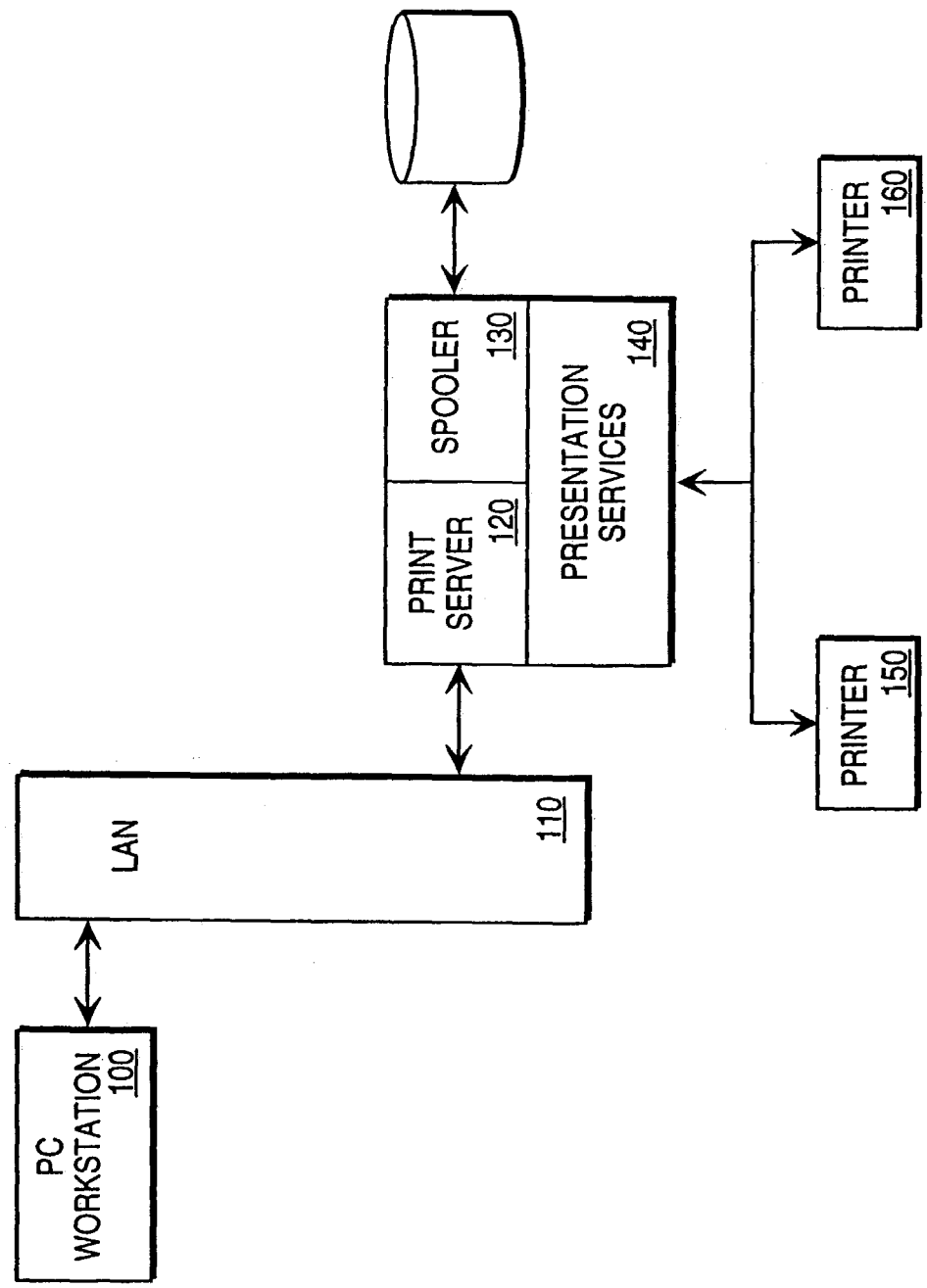
FIG. 1 is a simplified block diagram depicting a local area network (LAN) printing environment.

A flexible and extensible virtual printer architecture is described. According to various embodiments of the present invention, a virtual printer is interposed between an output server and a heterogeneous group of presentation devices, such as printers, fax servers, email servers, pagers, televisions, file viewers, copiers, and other devices, which may or may not natively support the data stream provided by the output server, thereby providing a common interface to the heterogeneous group of presentation devices. Advantageously, in this manner, the output server is not burdened with having to handle device-specific information for each presentation device. Rather, the output server and the virtual printer may communicate via a single, well-defined presentation device data stream (also referred to as a presentation device control protocol). Therefore, the addition of new presentation devices behind the virtual printer has a relatively trivial impact upon the output server compared with the effect of such a change in prior printing environment architectures. Additionally, as will be explained in more detail below, by removing the device dependencies from the output server and placing them further down stream, future enhancements to the output server, such as new transforms or other new data stream manipulations, are automatically inherited by presentation devices that are supported by the virtual printer architecture.

According to one aspect of the present invention, the virtual printer may present itself to the output server as an Intelligent Printer Data Stream (IPDS) device while converting the input data stream to other formats that are natively supported by presentation devices. In this manner, the virtual printer acts as an IPDS proxy for the presentation devices thereby allowing them to take advantage of the rich set of capabilities and data stream transforms provided by IPDS.

According to another aspect of the present invention, a logical channel is provided for conveying device status and various levels of job status through the virtual printer and back to the output server. Additionally, a mechanism is provided for reporting asynchronous job and device status. In this manner, the end user may be provided with job and device status information that is not communicated to the end user by existing printing solutions.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

For convenience, embodiments of the present invention will be described with reference to a particular data stream, i.e., the Intelligent Printer Data Stream (IPDS). In alternative embodiments, alternative data streams may be employed, such as PostScript, Hewlett Packard Printer Control Language (PCL), Hewlett Packard Graphics Language (HPGL), Printer Job Language (PJL), or Apple Talk Printer Access Protocol (PAP). However, preferably, the data stream employed is both architected and bi-directional. By "architected" what is meant is, a standardized set of controls transmitted with raw data which specifies how the data is to be presented. By "bi-directional," what is meant is a synchronization mechanism is provided between the host (e.g., a printer server or other data stream generator) and the server (e.g., a printer or other output device) allowing them to synchronize at various points in the data stream. For example, the host and server may be able to synchronize at a command or page-level according to an acknowledgment protocol which provides for the exchange of host initiated queries and server reply information. Also, while embodiments of the present invention will be described with reference to a particular transport level protocol (also referred to as a carrying protocol or a communication protocol), i.e., transmission control protocol (TCP), other protocols that provide an error free, bi-directional byte stream between two endpoints may be employed, such as Xerox Network Systems (XNS), S/370 Parallel Channel Host Attachment, or the like. Finally, while only a limited number of presentation devices are specifically referred to herein, such as printers, fax servers, email servers, and pagers, the method and apparatus described herein are equally applicable to other destinations and presentation devices that are capable producing character shapes, graphics pictures, images, or other symbols on a physical medium, such as paper, a display device, or a disk. Additionally, the method and apparatus described herein are applicable to destinations and/or presentation devices that are capable of retransmission, such as a base station for satellite or cellular communications or a paging system, for example.

An Exemplary Software Architecture

Figure 2:
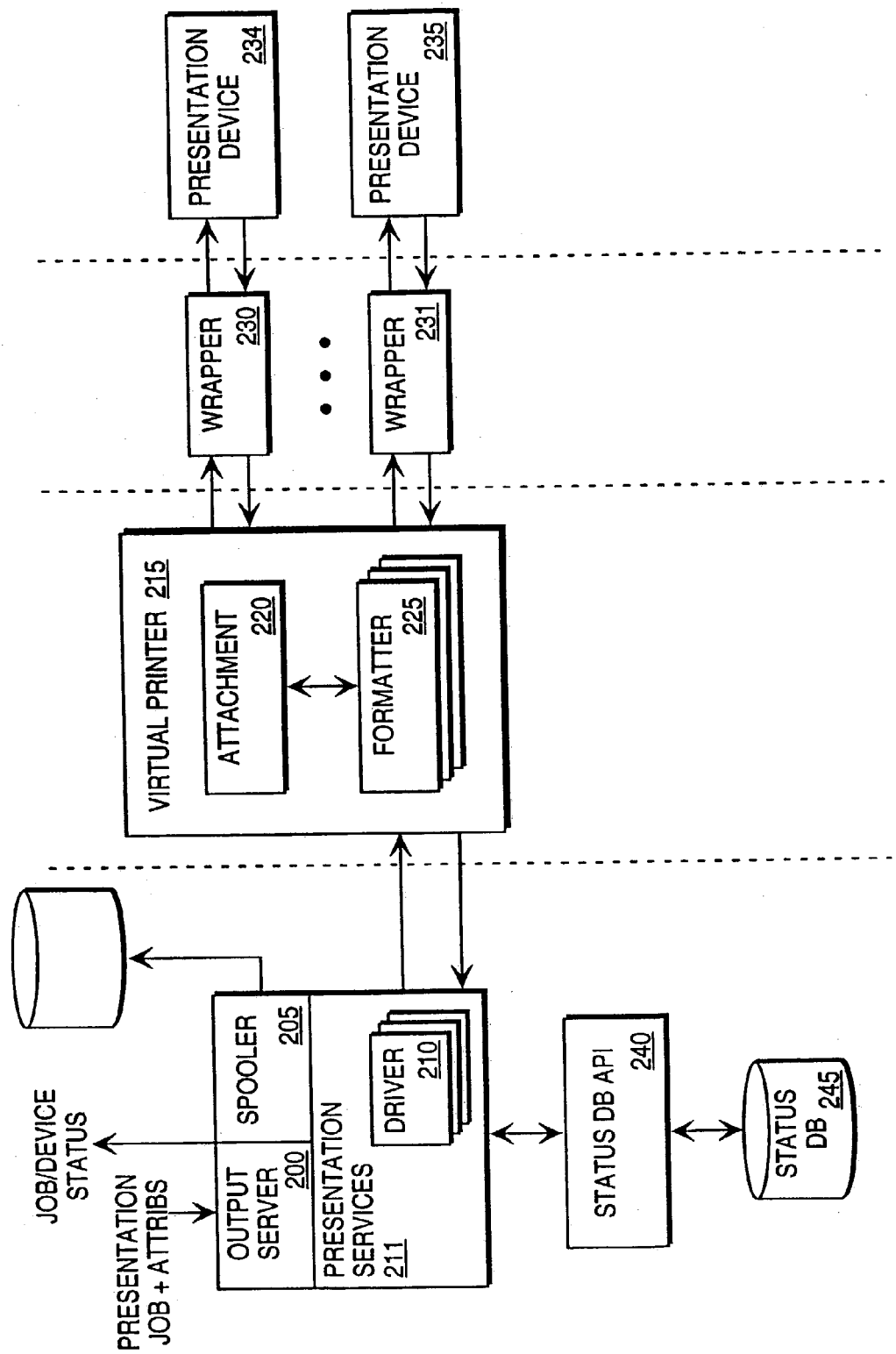
FIG. 2 is a block diagram illustrating an exemplary software architecture according to one embodiment of the present invention

FIG. 2 illustrates an exemplary software architecture according to one embodiment of the present invention. Before describing the novel software architecture, it may be useful to summarize a few of the many advantages and features. One feature of the present embodiment, is the ability of the architecture to retain content while gaining runtime efficiencies. For example, processing that is typically performed by printer drivers, i.e., the generation of device dependent data and presentation controls, is pushed down stream to a point at which the data stream is very simple and therefore more easily transformed to a device dependent format. Additionally, by decoupling device dependencies from the output server in the manner described below, efficiencies are also achieved during development, as less code is required in order to provide support for new devices. Another important characteristic to be pointed out in the software architecture of the present embodiment is the simple, well-defined interfaces between components of the architecture. Of course, various other features and advantages will be recognized by those of ordinary skill in the art from the following description.

According to the embodiment depicted, a presentation environment architecture includes the following components: an output server 200, a virtual printer 215, one or more wrapper functions 230, 231, one or more presentation devices 234, 235, a status database application programming interface (API) 240, and a status database 245. In various embodiments, more or less components may be employed by combining or excluding one or more of the above-referenced components or adding additional components. Importantly, the components may reside on the same computer system or be distributed across several different computer systems on a local area network, for example. FIG. 2 illustrates one possible distribution of components in which the dashed lines represent a physical separation between components. When the components are physically separated, bi-directional communication links may be established and maintained among the components via a TCP/IP, sockets-based interface, for example.

In one embodiment, the output server 200 may comprise a current or future release of InfoPrint Manager, Print Services Facility (PSF), e.g., PSF/MVS or PSF/400, or other IPDS enabled print server. In the present example, the output server 200 receives presentation jobs (e.g., print jobs, fax jobs, and other output jobs) and user-specified job attributes from a workstation, for example, and returns job and/or device status. The output server 200 may support outputting the data received to a plurality of heterogeneous presentation devices 234, 235 by wrapping, in an object container, destination control information (e.g., an email address for sending the presentation job to an email server, a phone number for sending the presentation job to a fax server) provided in the user-specified job attributes. The object container may then proceed transparently through the output server processing and continue down stream where it may be used at the appropriate point during the processing of the presentation job in the virtual printer 215 or wrappers 230, 231. Those skilled in the art will recognize the wrapper as a generalization of a print mechanism which no longer needs to be physically contained within a printer. Importantly, forms of the verbs "print" and "output" in the context of this application, refer broadly to the act of communicating a data stream containing data that is destined for a presentation device or something capable of retransmitting the job to a presentation device. These definitions include, but are not limited to, the traditional meaning of print, e.g., sending data to a printer in order to produce character shapes, graphics pictures, images, or other symbols with ink, toner, or the like on a physical medium, such as paper. According to these definitions, data may be said to be "printed" or "output" to a fax server or a pager, for example.

At any rate, returning to the embodiment depicted, the output server 200 includes a spooler 205 and presentation services 211. The presentation services 211 may include one or more drivers 210 configured to generate commands suitable for driving various presentation devices, one of which is configured to interface with the virtual printer 215.

In the preferred embodiment, the presentation device control protocol exchanged between the output server 200 and the virtual printer 215 is the Intelligent Printer Data Stream (IPDS). IPDS is an architected, bi-directional printer data stream that contains both data and controls defining how the data is to be presented. Additionally, the IPDS architecture provides an extensive acknowledgment protocol at the data stream level which provides for exchange of query-reply information and allows the return of detailed exception information. IPDS data streams are independent of the carrying communications protocol. This allows the transmission of the same data stream to presentation devices attached to channels, controllers, local area networks, and any other type of networking link that supports the transparent transmission of data. IPDS transfers data and controls through commands that describe the presentation of data and provide for dynamic management of resident fonts and of downloaded resources, such as overlays, page segments, and loaded fonts. Additionally, IPDS commands allow control of device functions such as duplexing, media-bin selection, and output finishing. Further background and information regarding the IPDS architecture may be found in a publication entitled, "Intelligent Printer Data Stream Reference," Order Number S544-3417, published March 1996, which is available from IBM Printing Systems Company of Boulder, Colo.

Importantly, while this embodiment is described with reference to a output server supplying a printer data stream, such as IPDS, to the virtual printer 215, the present invention is not limited to receipt of a printer data stream from any particular type of device. In alternative embodiments, the data stream may be received directly or indirectly from a workstation or other data stream generator or may be read from a scripted file, for example.

In the embodiment depicted, the virtual printer 215 includes an attachment layer 220 and one or more formatters 225. The attachment layer 220 and one or more of the drivers 210 establish a bi-directional communication link between the output server 200 and the virtual printer 215 through which communication may occur. Typically, the output server 200 will provide logical pages of arbitrarily complex source data embedded in a data stream and corresponding user-specified job attributes (potentially for each logical page). The source data may include, for example, text, image, graphics and/or other embedded objects, such as sound or video. At any rate, responsive to the data stream, the attachment layer 220 may provide the output server 200 with such things as page counters (e.g., received page count, committed page count), status and other error conditions relating to the processing of the data stream by the virtual printer 215. As will be described in detail below, embodiments of the virtual printer architecture may provide various levels of job status, thereby allowing the output server 200 to recover from certain data stream and device errors, for example.

Preferably, to leverage existing code, the attachment layer 220 may receive an architected, bi-directional printer data stream from an existing printer driver. In one embodiment, the virtual printer 215 is capable of acting like a particular printer, such as one of many different IPDS printers (e.g., InfoPrint 60 or InfoPrint 4000), by performing the bi-directional communications as the particular printer would. In this manner, the virtual printer 215 may act as a proxy for presentation devices that may or may not natively support the data stream received by the virtual printer 215. Ultimately, the output server 200 (or other data stream generator) is essentially made to believe that it is communicating directly with a printer rather than an intermediate entity behind which a heterogeneous group of presentation devices may reside.

The attachment layer 220 employs one or more formatters 225, which may operate in parallel, to reduce the data stream received from the output server 200 to a simple format. The formatters 225 receive the data stream from the attachment layer 220 and convert the data stream to a widely supported, simple format, such as a bit map, text, a frame of video, or one of many other well-defined interchange formats, thereby facilitating subsequent re-packaging in a device-dependent manner by the appropriate wrapper function 230, 231. In embodiments employing presentation devices that accept imaged data, at least one of the formatters 225 may comprise a rasterizer. In this case, if the rasterized image is bi-level it can be compressed, for example, via International Telecommunications Union-Telecommunications Standardization Sector (ITU-TSS) T.6 Group 4 two dimensional coding standard for facsimile. Other compression algorithms or formats may be used. For example, the rasterizer may convert to other image formats to accomodate color. Then, the resulting image data and associated controls may be packaged by the wrapper function, one presentation unit at a time to build a job for submission to a presentation device. The presentation unit is a block of data whose size is device dependent. For example, the presentation unit for a pager might be a screen full of text, while the presentation unit for a printer may be one or two sides of a sheet. In other embodiments, which may communicate with text-based presentation devices such as pagers, at least one of the formatters 225 may comprise a text extractor. Numerous alternative formatters are possible depending upon the characteristics of the presentation devices supported.

The wrapper functions 230, 231 abstract the device dependent details from the virtual printer 215. In general, wrapper functions receive data in a device independent format, transform it into a device-specific format, and drive the appropriate presentation device. Importantly, depending upon the particular implementation wrappers may be defined for a particular type of presentation device (e.g., a InfoPrint 60 IPDS printer, a Lotus Notes email server), for presentation device families (e.g., fax servers, email servers, PostScript printers, PCL printers, IPDS printers), or for various groupings of presentation device families. In one embodiment, the wrapper functions 230, 231 include a device independent portion and a device dependent portion (not shown). The device independent portion of the wrapper receives control object containers and data from the formatter in a fixed format and is essentially the same for each wrapper function 230, 231. However, the device dependent portion has knowledge of the data stream supported by the presentation devices with which it is associated, knowledge of how to apply the control information to the formatted data, knowledge of how to interpret and utilize the destination control information supplied to the output server 200, knowledge of the job ticket format required, if any, for job submission to its presentation devices, etc. The wrapper functions 230, 231 essentially receive device independent material, e.g., the formatted data from the formatters 225 and control information that describes the presentation of the data, and makes it device dependent based upon the control information and/or characteristics of the targeted presentation device. For example, the device dependent portion of the wrapper function may parse the destination control information and residual control information from the data stream and perform image operations, such as scaling, cropping and resolution modification, to accommodate various features and limitations of the targeted presentation device. Alternatively, depending on the specificity of the wrapper, it may be able to make the formatted data device dependent without reference to the destination control information. Importantly, as a result of device dependencies only being encoded in a portion of the wrapper and in the user specified destination control information, virtual printer support for new presentation devices may be accomplished by simply providing new wrapper functions and support for any new user-specified job attributes to be contained in the object containers.

Referring now to the status database application programming interface (API) 240, as will be described further below, it tracks job and device status for the output server 200. The status database API 240 may run independent of the output server 200 as a daemon process or other independent processing thread or process and may employ a status database 245 to store the job status information (e.g., stacked page count) and device status information (e.g., device failures, such as paper jam, out of toner, etc.). In one embodiment, communications between the status database API 240, the output server 200, and other processes may be accomplished via remote procedure calls.

Data Flow Through an Exemplary Software Architecture

Figure 3:
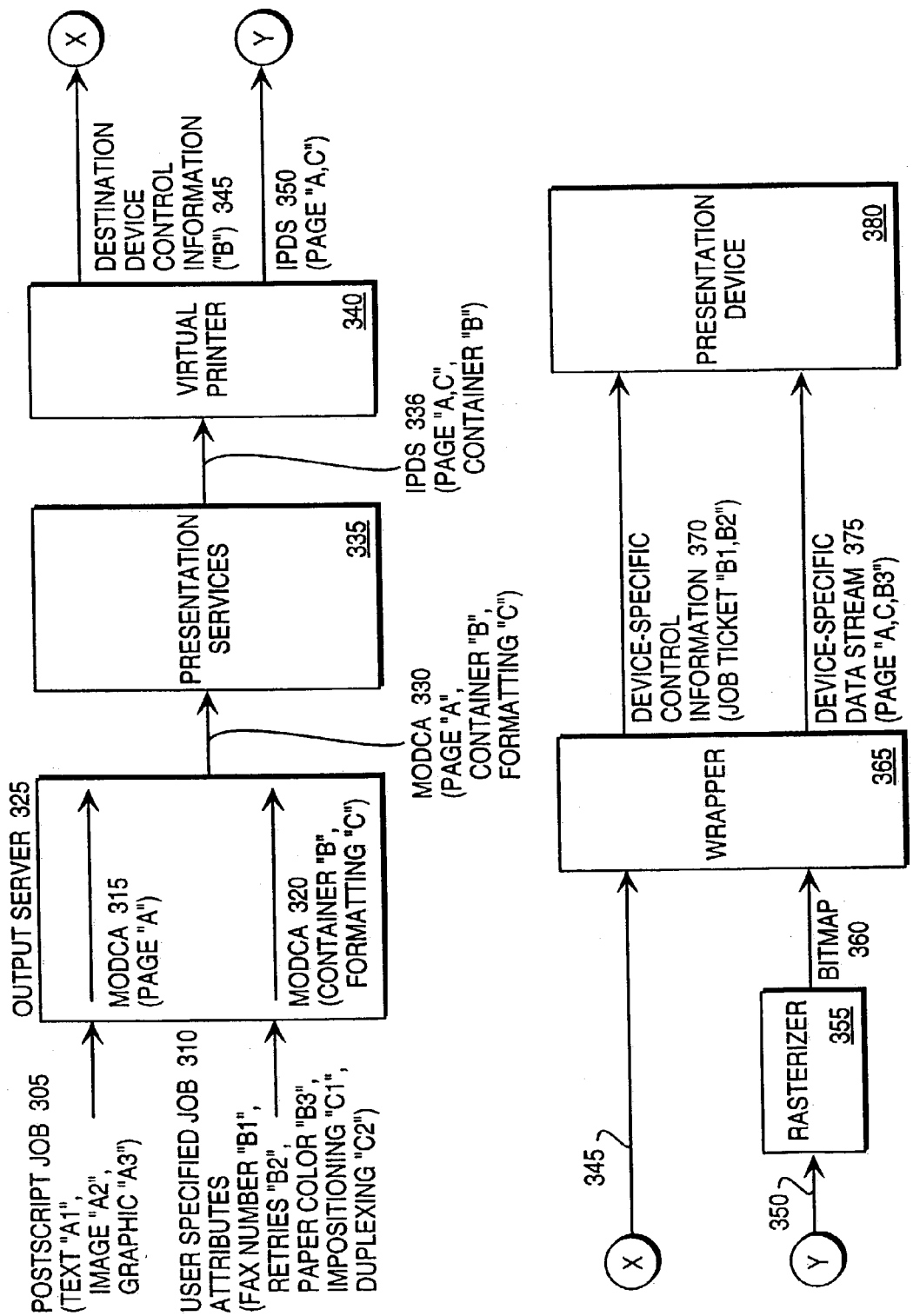
FIG. 3 is a block diagram illustrating exemplary data flow through the software architecture according to one embodiment of the present invention

FIG. 3 is a block diagram illustrating exemplary data flow through a software architecture similar to that of FIG. 2 according to one embodiment of the present invention. In this example, the data path from the user's workstation to a presentation device 380 includes an output server 325, presentation services 335, a virtual printer process 340, a rasterizer 355, a wrapper function 365, and finally the presentation device 380. The presentation job received in the present example is a PostScript fax job 305 comprising text, image, and graphic data. The PostScript job 305 is also accompanied by several user-specified job attributes 310. In general, user-specified job attributes may be categorized as either destination device control information or formatting information. In the present example, the fax number, the number of retries, and the paper color are examples of destination device control information, while impositioning and duplexing options are examples of formatting information. Typically, the user-specified job attributes may be provided as command line options to the output server 325 by the end user or they may represent user selections on a graphical user interface. In any event, the output server 325 transforms the PostScript job data into logical pages of an architected, device-independent common data format 315 for interchanging various input data streams, in this example, the common data format 315 is Mixed Object Document Content Architecture (MODCA). The user-specified job attributes are also transformed to the common data format 320. For example, a MODCA object container may be employed to carry the destination device control information.

The input 330 to the presentation services 335 includes pages of the common data format, their corresponding object containers, and formatting information. The presentation services 335 include transformations for applying the formatting information to the pages and for transforming the common data format to a data stream 336, such as IPDS. Importantly, the input data stream received by the output server 325 may be any of a number of formats, including but not limited to: PDF, PostScript, TIFF, GIF, JPEG, PCL, SAP, and ASCII. The output data stream 336 produced by the presentation services is equally flexible.

The virtual printer 340, parses the data stream 336 received from the presentation services 335, feeds destination device control information 345 extracted from the object containers to the wrapper function 365, and feeds the IPDS logical pages 350 to the rasterizer 355. The rasterizer 355 transforms the IPDS data stream 350 to a bitmap representation. Preferably, the bitmap representation is a compressed image format, such as that produced by ITU-TSS T.4 Group 3 two dimensional coding standard for facsimile (also referred to as G3) or ITU-TSS T.6 Group 4 two dimensional coding standard for facsimile (also referred to as G4).

The wrapper function 365 receives both destination device control information 345 and bitmaps 360 and presents device-specific control information 370, such as a fax job ticket, and a device-specific data stream 375 to the presentation device 380.

It should be appreciated that the above-described software architecture extends the functionality of the output server 325, including the transformations to and from MODCA, and the formatting capabilities of IPDS, to virtually any presentation device. For example, this architecture provides the ability to send N-up facsimiles. Advantageously, any new features added to either MODCA or IPDS are automatically inherited by presentation devices that are supported by the architecture.

An Exemplary Computer Architecture

Figure 4:
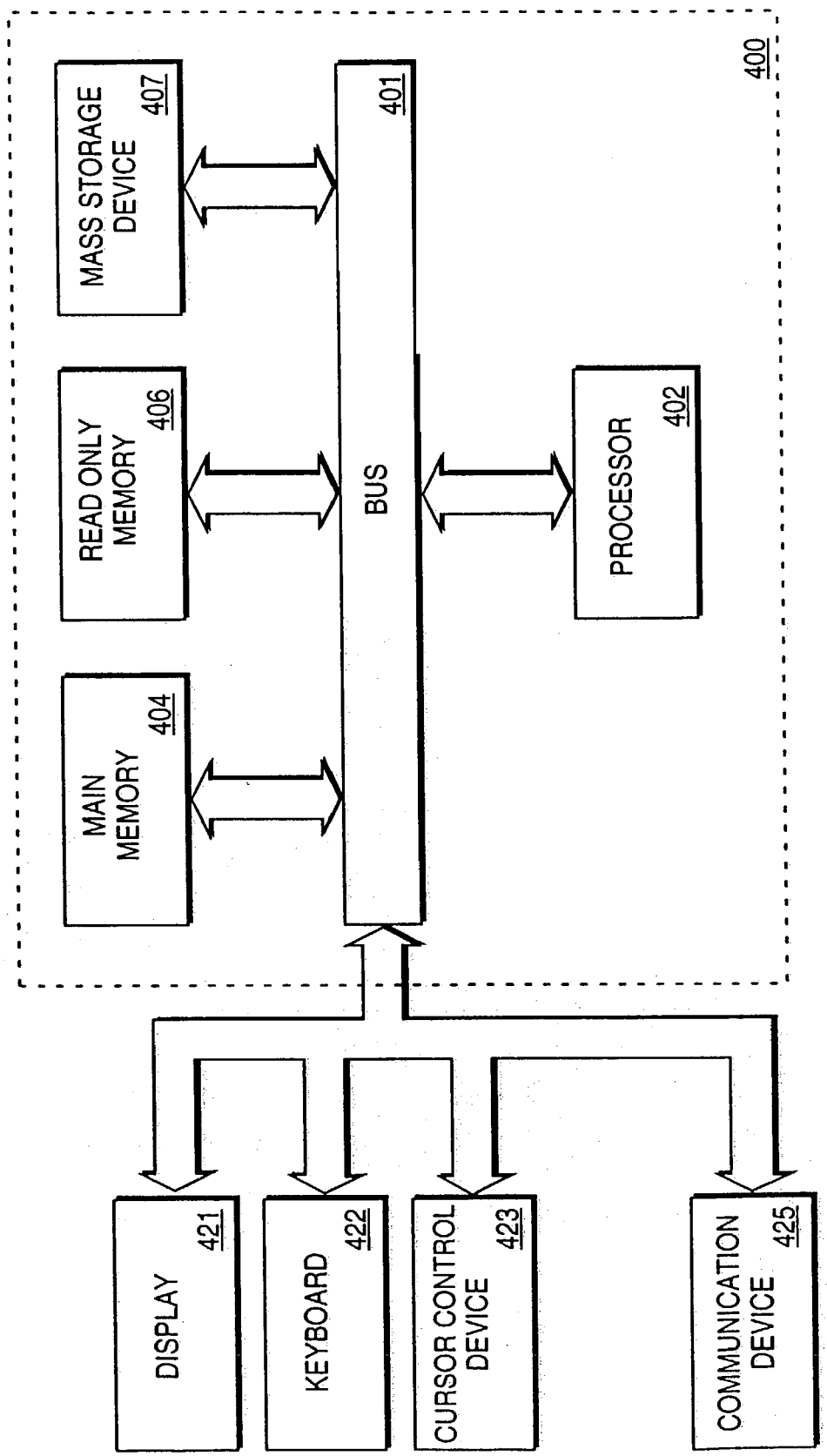
FIG. 4 is an example of a typical computer system upon which one embodiment of the present invention or components thereof may be implemented.

Having briefly described one embodiment of the virtual printer architecture and how data flows through such an architecture, a computer system 400 representing an exemplary workstation, host, or server in which features of the present invention may be implemented will now be described with reference to FIG. 4. Computer system 400 comprises a bus or other communication means 401 for communicating information, and a processing means such as processor 402 coupled with bus 401 for processing information. Computer system 400 further comprises a random access memory (RAM) or other dynamic storage device 404 (referred to as main memory), coupled to bus 401 for storing information and instructions to be executed by processor 402. Main memory 404 also may be used for storing temporary variables or other intermediate information during execution of instructions by processor 402. Computer system 400 also comprises a read only memory (ROM) and/or other static storage device 406 coupled to bus 401 for storing static information and instructions for processor 402.

A data storage device 407 such as a magnetic disk or optical disc and its corresponding drive may also be coupled to computer system 400 for storing information and instructions. Computer system 400 can also be coupled via bus 401 to a display device 421, such as a cathode ray tube (CRT) or Liquid Crystal Display (LCD), for displaying information to an end user. For example, graphical and/or textual depictions/indications of job and device status, previews of presentation jobs, and other data types and information may be presented to the end user on the display device 421. Typically, an alphanumeric input device 422, including alphanumeric and other keys, may be coupled to bus 401 for communicating information and/or command selections to processor 402. Another type of user input device is cursor control 423, such as a mouse, a trackball, or cursor direction keys for communicating direction information and command selections to processor 402 and for controlling cursor movement on display 421.

A communication device 425 is also coupled to bus 401. Depending upon the particular presentation environment implementation, the communication device 425 may include a modem, a network interface card, or other well known interface devices, such as those used for coupling to Ethernet, token ring, or other types of physical attachment for purposes of providing a communication link to support a local or wide area network, for example. In any event, in this manner, the computer system 400 may be coupled to a number of clients and/or servers via a conventional network infrastructure, such as a company's Intranet and/or the Internet, for example.

High Level Output Processing

Figure 5:
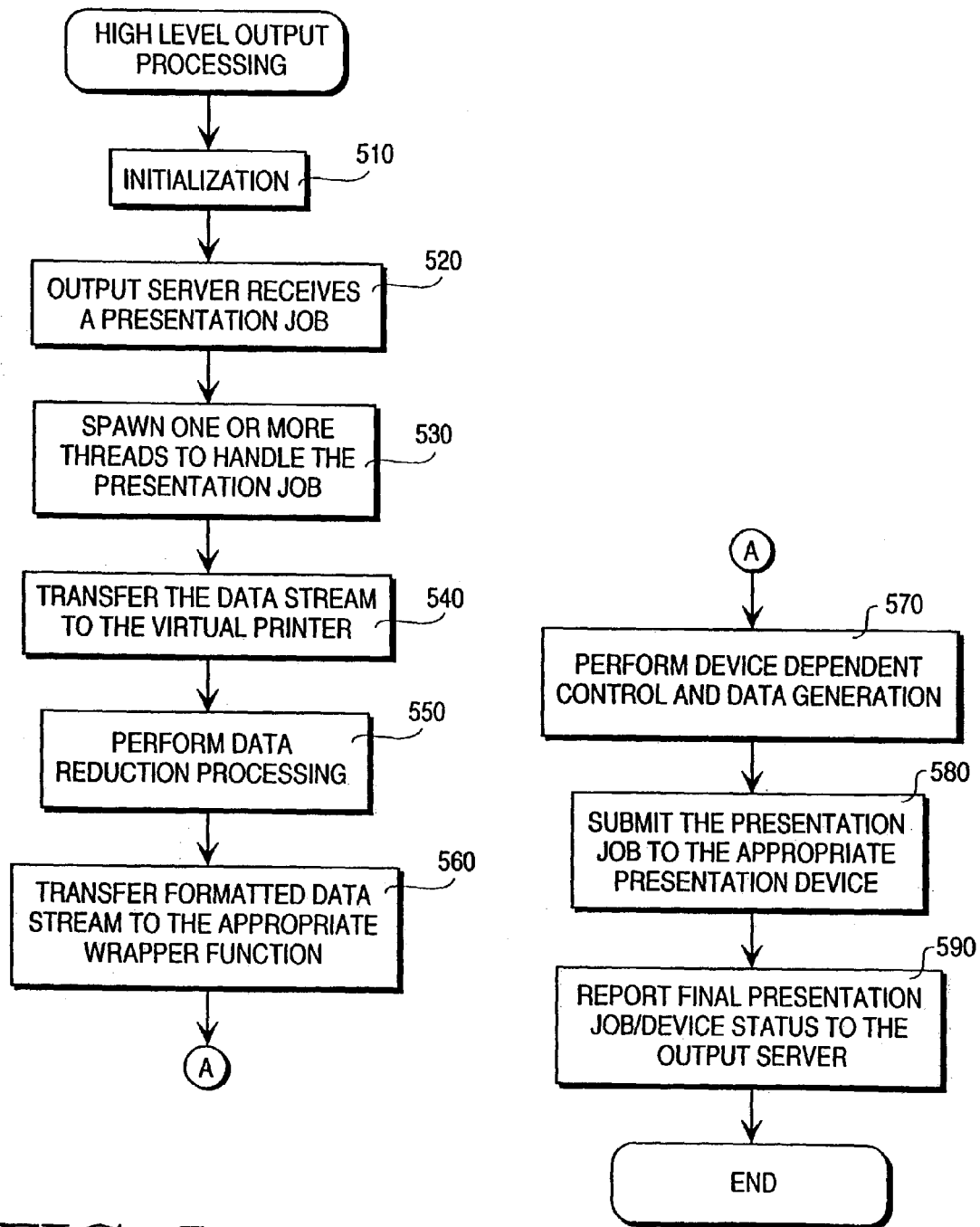
FIG. 5 is a flow diagram illustrating high level output processing according to one embodiment of the present invention.

FIG. 5 is a flow diagram illustrating high level output processing according to one embodiment of the present invention. At step 510, initialization processing is performed including establishment of a bi-directional communications link between the output server 200 and the attachment layer 220 of the virtual printer 215. Additionally, the architectural features of the data stream that are supported by the virtual printer 215 may be reported to the output server 200. Initialization may also include the addition of presentation device records to the status database 245. At step 520, a presentation job is received by the output server 200. One or more threads or processes are spawned, at step 530, to handle applying the transformations and formatting described above. At step 540, the data stream incorporating the transforms and formatting applied in step 530 is transferred to the virtual printer 215. The virtual printer 215 simplifies the data stream by performing data reduction processing at step 550. The formatted data stream produced by the virtual printer 215 is then transferred to the appropriate wrapper function at step 560. At step 570, the wrapper function generates device dependent control information and a device dependent data stream for the presentation device to which the presentation job is destined. Having appropriately formatted the presentation job for the presentation device, at step 580, the job may be submitted to the presentation device. At step 590, the wrapper function reports the final status of the presentation job and/or the presentation device's status to the output server.

An Exemplary Output Server Thread or Process

Figure 6:
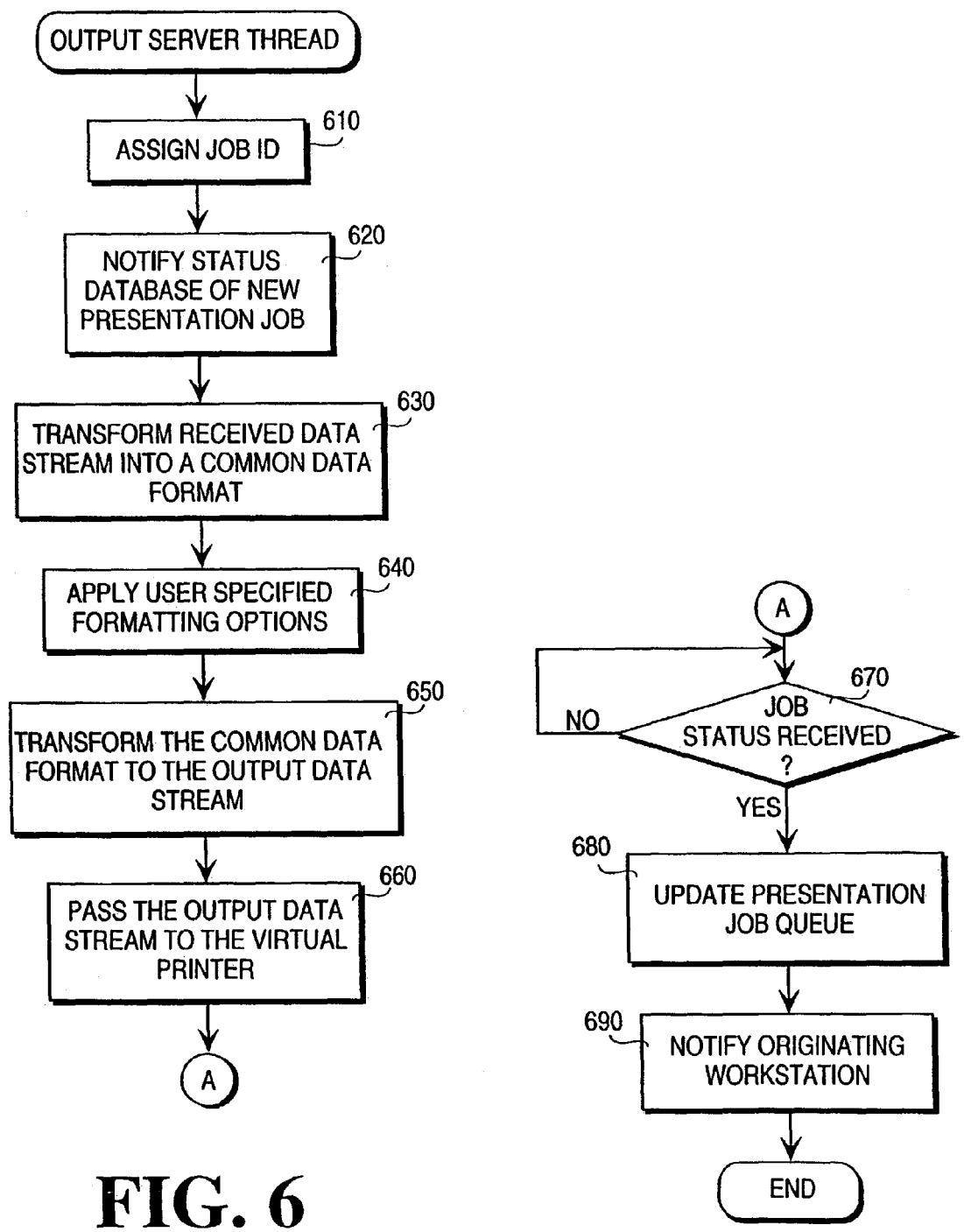
FIG. 6 is a flow diagram illustrating output server thread or process processing according to one embodiment of the present invention.

FIG. 6 is a flow diagram illustrating output server thread or process processing according to one embodiment of the present invention. According to the embodiment depicted, the output server thread or process processing generally breaks down into a job initialization stage, a data stream transformation stage, a job submission stage, and post job submission processing. The job initialization stage is represented by steps 610 and 620, the data stream transformation stage is represented by step 630 through step 650, the job submission stage is represented by step 660, and the post job submission processing includes steps 670 through 690. Briefly, according to one feature of the present embodiment, a status thread or process awaits the final status of the presentation job. According to one embodiment, the wait mechanism is implemented the status thread or process polling a status database interface. Alternatively, the status thread or process may await a callback from the status database interface which is made when the status database receives an indication of the presentation job's status from the wrapper function, for example. In one embodiment, the steps described below may be performed under the control of a programmed processor, such as processor 202. However, in alternative embodiments, the steps may be fully or partially implemented by programmable or hardcoded logic.

A new unique job ID is assigned to the presentation job at step 610. The status database is notified of the new presentation job, at step 620, by way of a remote procedure call to an interface to the status database, for example. Therefore, the virtual printer 215 and/or the wrapper functions 230, 231 may report the presentation job's status to an entity that resides outside the bi-directional channel established between the output server 200 and the presentation device. Importantly, in this manner, the independent job status recording means provides a non-blocking approach for reporting asynchronous job and device status to the output server 200.

At step 630, the data stream received by the output server 200 is transformed into a common data format. In this manner, rather than coding user-specified formatting options for each of many possible input data stream formats, such formatting need only be coded for the common data format. At step 640, the user-specified formatting options, such as impositioning, are applied to the common data format. After applying the formatting options, at step 650, the common data format is transformed to the data stream format that is output by the output server 200. The presentation job is then submitted, at step 660, by providing the output data stream to the virtual printer 215. After the job is submitted, at least one output server thread or process, referred to herein as the status thread or process, waits for the final job status to be reported.

At step 670, it is determined whether or not the presentation job's status has been received. If so, processing continues with step 680; otherwise, the status thread or process continues to wait. Importantly, while the embodiment illustrated appears to be a polling loop, as indicated above, status may be provided by way of a callback function that is called by the status database interface after it receives the presentation job's final status. According to this embodiment, when the presentation job's status is finally received job queues are updated and the originating workstation is notified of the status by steps 680 and 690, respectively.

Virtual Printer Processing

Figure 7:
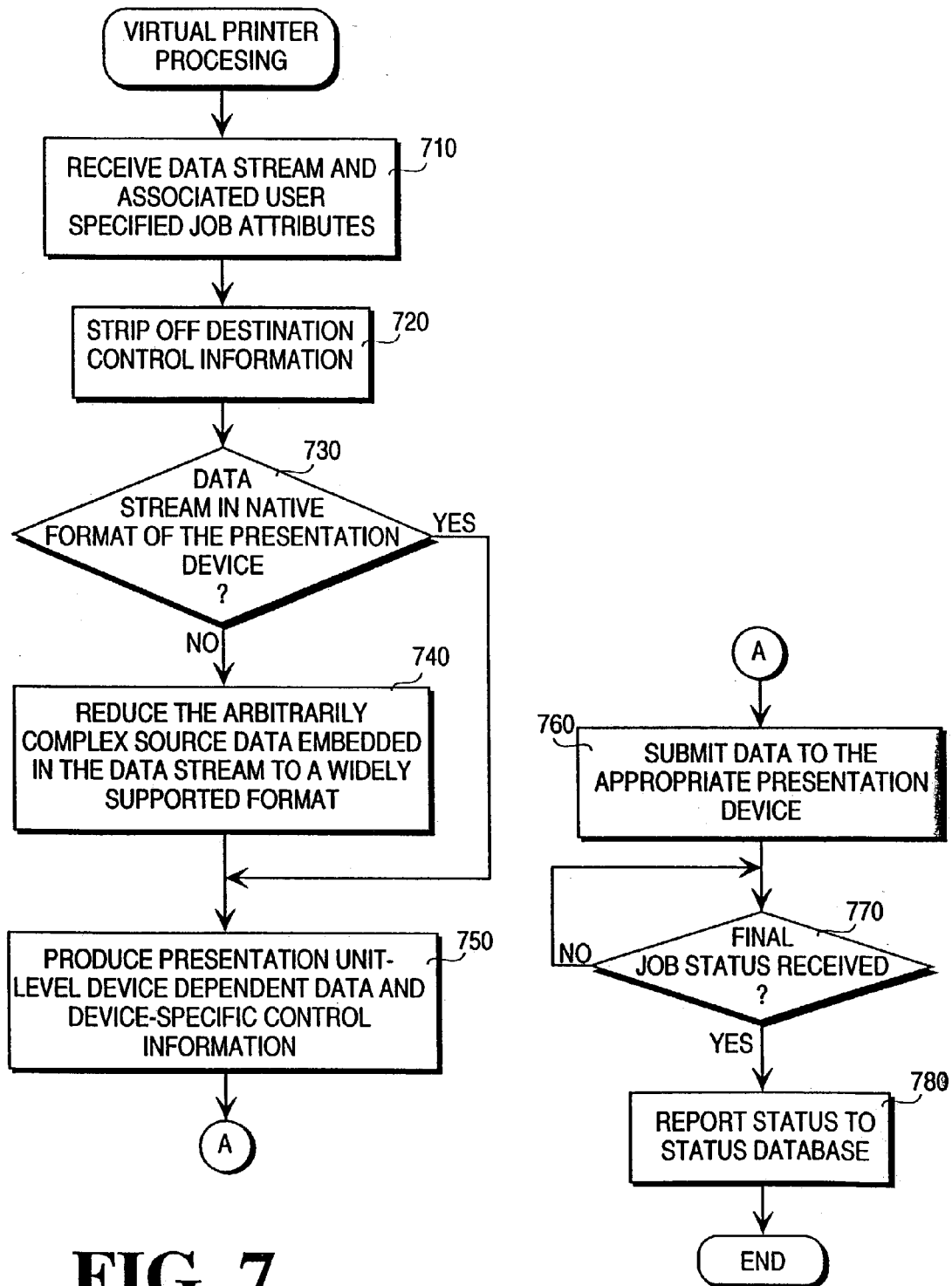
FIG. 7 is a flow diagram illustrating virtual printer processing according to one embodiment of the present invention.

FIG. 7 is a flow diagram illustrating virtual printer processing according to one embodiment of the present invention. At step 710, the virtual printer 215 receives a data stream representing a presentation job and the job's user-specified attributes. At step 720, the attachment layer 220 parses the received data stream and separates the destination control information from the data stream. The attachment layer 220 provides the destination control information to the wrapper associated with target presentation device and may, if appropriate, examine the destination control information, for example, to effect additional status reporting from the attachment layer 220 to the output server 200. Before submitting the data stream to the formatter 225, at step 730, the attachment layer 220 determines whether the data stream can be cut-through to the wrapper function or if formatting needs to be performed. If the data stream is already in a native format recognized by the target presentation device, processing continues with step 750; otherwise processing continues with step 740. At step 740, the formatter 225, such as a rasterizer, reduces the source data embedded in the received data stream to a widely supported device independent format. In this manner, the data steam is simplified in preparation for performing device-dependent processing in the wrapper.

At step 750, a wrapper of the type necessary for communicating to the target presentation device is instantiated. The wrapper takes device independent data and produces presentation unit-level device-specific data and device-specific control information in the form of a data stream that can be submitted to the presentation device. For example, an email wrapper function may wrap bitmap images (from a rasterizer, for example) in a page description language (PDL), such as PDF, before submitting the data to the email server. Similarly, a fax wrapper may wrap bitmap images in TIFF for submission to a fax server. Importantly, as indicated above, a single wrapper function may support various groupings of presentation device families, therefore, a single wrapper may support both email and fax presentation devices. To distinguish between the two types of input, such a wrapper may examine the destination control information, for example. A phone number specified as the destination would be indicative of input destined to a fax or fax server, while an email address would be indicative of data destined for an email server.

At step 760, the presentation job is submitted to the appropriate presentation device(s) in the form of a device dependent data stream. In cases where bi-directional communication may be established with the presentation device, the wrapper may wait for a final job status to be returned from the presentation device(s) at step 770. Otherwise, the wrapper may itself determine the final job status upon successfully transmitting the job to the presentation device. When the job status is determined, it is reported to the status database interface, at step 780. Importantly, in order to facilitate error recovery processing and delivery of jobs to multiple destinations, the wrapper may spool the data to a file.

Status Processing

Figure 8:
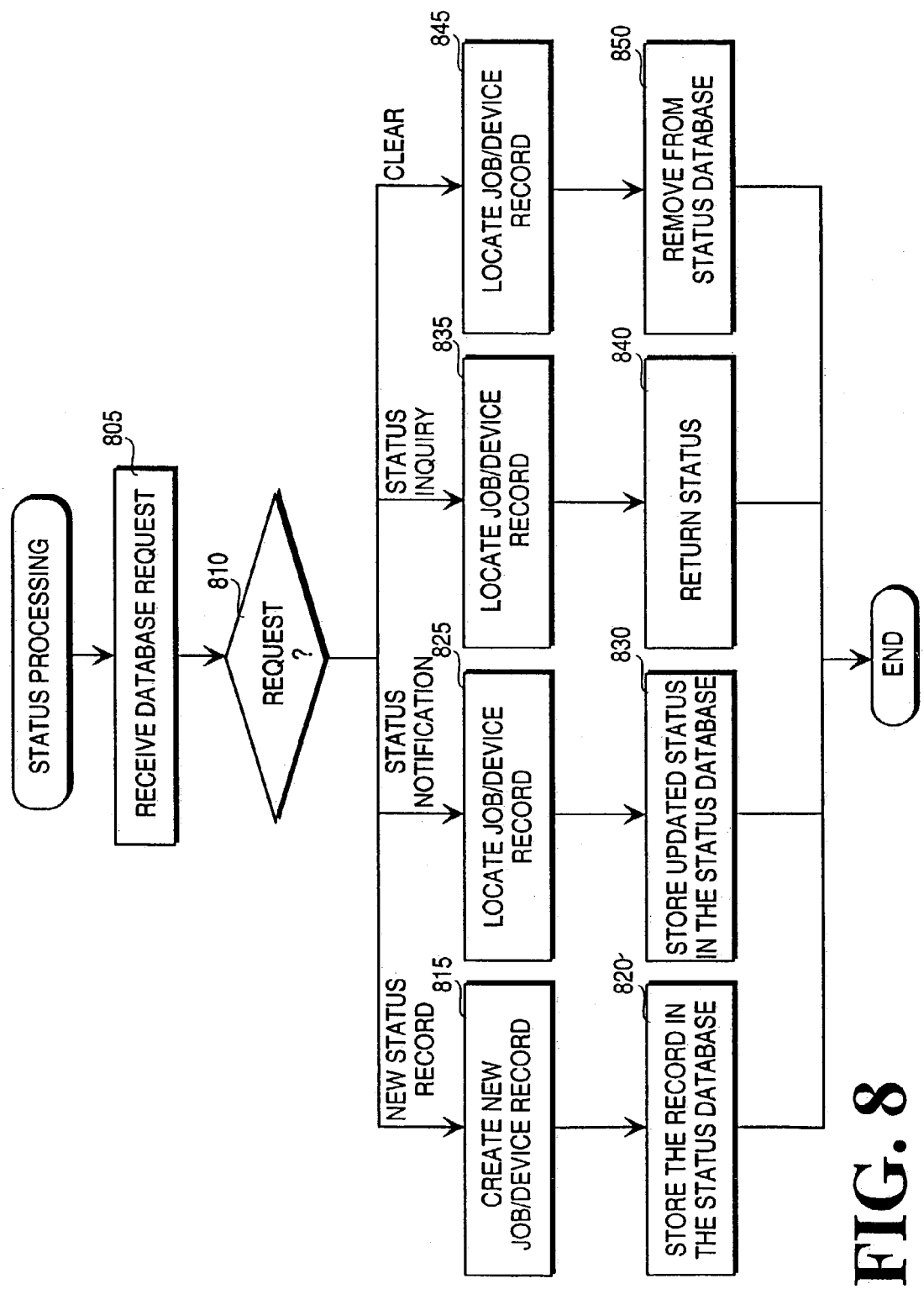
FIG. 8 is a flow diagram illustrating status task processing according to one embodiment of the present invention.

FIG. 8 is a flow diagram illustrating status processing according to one embodiment of the present invention. In the embodiment depicted, a database request is received at step 805. In this example, the request may be one of four types of requests: a new status record request, a status notification, a status inquiry, and a clear request.

A request for a new status record is typically made by the output server 200 to establish a new device or job record. A status notification is typically made by a wrapper function, but may also be made by one of the virtual printer components or the presentation services 211. Importantly, any component with knowledge of the presentation job ID can communicate with the status database interface to report errors, thereby permitting the output server 200 to restart the job from the point of failure.

Status inquiries are typically associated with the output server 200 as presentation status threads or processes poll for the status of their presentation jobs. Finally, a clear request is usually the result of an output server call to delete a record that no longer needs to be tracked.

At step 810, the type of request is determined. If the request is for a new status record, processing continues with step 815. If the request is a status notification, processing continues with step 825. If the request is a status inquiry, the processing continues with step 835. Otherwise, if the request is a clear request, processing continues with step 845.

At step 815, depending upon the type of record requested, a new job or device record is created and initialized. At step 820, the newly created record is stored in the status database.

At step 825, the job or device record relating to the status notification (as determined by the job/device ID) is located in the status database. The record corresponding to the request is updated at step 830.

At step 835, the job or device record relating to the status inquiry (as determined by the job/device ID) is located in the status database. The record corresponding to the request is retrieved and the status is returned to the caller at step 840. As mentioned above, while the embodiment illustrated illustrates a mechanism by which status may be polled, it may be desirable to provide a mechanism by which interested processes may be notified when a status change occurs. According to one embodiment, therefore, the status database interface may use a subscription list, for example, and perform a callback to the interested processes as status notifications are received.

At step 845, the job or device record relating to the status notification (as determined by the job/device ID) is located in the status database. The record corresponding to the request is deleted at step 850.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of providing a presentation job status to an output server, the method comprising:
   the output server receiving the presentation job;
   the output server spawning a host process associated with the received presentation job to handle the presentation job;
   the host process spawning a wrapper process;
   transferring the presentation job to the wrapper process;
   submitting the presentation job to a presentation device; and
   the wrapper process reporting a status of the presentation job at the presentation device to the output server, wherein a status of a subsequent presentation job is reported to the output server prior to the status of the presentation job and the subsequent presentation job is received by the output server after the presentation job.

2. The method of claim 1 wherein the presentation job is selected from a list comprising a printer job and a fax job.

3. The method of claim 1 further including performing data reduction processing prior to transferring the presentation job to the wrapper process.

4. The method of claim 1 wherein the wrapper process is capable of bi-directionally communicating with the presentation device.

5. The method of claim 1 further including performing presentation device-dependent formatting on at least one portion of data associated with the presentation job prior to submitting the presentation job to the presentation device.

6. The method of claim 5 wherein the device-dependent formatting is performed by the wrapper process.

7. The method of claim 1 wherein each of the processes is implemented as a thread.

8. The method of claim 1 further including spawning a host job status process to wait for a status pertaining to the presentation job.

9. The method of claim 8 wherein the host job status process is implemented as a thread.

10. The method of claim 8 wherein the host job status is received prior to the wrapper process reporting the status of the presentation job to the output server.

11. The method of claim 8 wherein the host job status process is spawned by the host process.

12. The method of claim 1 wherein the presentation job includes data related to an item selected from a list comprising text, image, graphic data, embedded objects, sound, and video.

13. The method of claim 1 wherein the wrapper process determines whether the status of the presentation job reported to the output server is a final status of the presentation job.

14. The method of claim 1 wherein the presentation job status indicates a stacked page count.

15. The method of claim 1 wherein the wrapper process further performs one or more of the following:
   receiving data in a device-independent format;
   transforming data into a device-specific format; and
   drive the presentation device.

16. The method of claim 15 wherein the device-specific format is specific to the presentation device.

17. The method of claim 15 wherein the device-specific format transformation includes an operation selected from a group comprising image scaling, image cropping, and resolution modification.

18. The method of claim 1 wherein the submitted presentation job to the presentation device is in a device-specific format that is supported by the presentation device.

19. The method of claim 1 wherein the reporting to the output server is provided to the host process.

20. The method of claim 1 wherein each wrapper process function is performed by a distinct instance of the wrapper process.

21. A computer system for providing a presentation job status to an output server, the computer system comprising:
   the output server to receive the presentation job;
   a virtual presentation device implemented as a software facility on the output server, the virtual presentation device including a host process associated with the received presentation job to handle the presentation job and a wrapper process to determine a final status of the presentation job;

a reporting facility implemented within the wrapper process to report the final status of the presentation job to the output server, wherein a final status of a subsequent presentation job is reported to the output server prior to the final status of the presentation job and the subsequent presentation job is received by the output server after the presentation job.

22. The computer system of claim 21 wherein the presentation job is selected from a list comprising a printer job and a fax job.

23. The computer system of claim 21 wherein the wrapper process is capable of bi-directionally communicating with the presentation device.

24. The computer system of claim 21 wherein each of the processes is implemented as a thread.

25. The computer system of claim 21 wherein the host process spawns a host job status process to wait for a status pertaining to the presentation job.

26. The computer system of claim 21 wherein the wrapper process further performs one or more of the following:
receiving data in a device-independent format;
transforming data into a device-specific format; and
drive the presentation device.

27. A computer system for providing a presentation job status to an output server, the computer system comprising:
means for the output server receiving the presentation job;
means for the output server spawning a host process associated with the received presentation job to handle the presentation job;
means for the host process spawning a wrapper process;
means for transferring the presentation job to the wrapper process;
means for submitting the presentation job to a presentation device; and
means for the wrapper process reporting a status of the presentation job at the presentation device to the output server, wherein a status of a subsequent presentation job is reported to the output server prior to the status of the presentation job and the subsequent presentation job is received by the output server after the presentation job.

28. The computer system of claim 27 further including means for performing presentation device-dependent formatting on at least one portion of data associated with the presentation job prior to submitting the presentation job to the presentation device.

29. An article of manufacture for providing a presentation job status to an output server, the article comprising:
a machine readable medium that provides instructions that, if executed by a machine, will cause the machine to perform operations including:
receiving at the output server the presentation job;
spawning at the output server a host process associated with the received presentation job to handle the presentation job;
the host process spawning a wrapper process;
transferring the presentation job to the wrapper process;
submitting the presentation job to a presentation device; and
the wrapper process reporting a status of the presentation job at the presentation device to the output server,
wherein a status of a subsequent presentation job is reported to the output server prior to the status of the presentation job and the subsequent presentation job is received by the output server after the presentation job.

30. The article of claim 29 wherein the operations further include performing data reduction processing prior to transferring the presentation job to the wrapper process.

31. The article of claim 29 wherein the operations further include performing presentation device-dependent formatting on at least one portion of data associated with the presentation job prior to submitting the presentation job to the presentation device.

* * * * *